Sept. 23, 1952    R. RABE    2,611,464
CAM OPERATED COUPLING

Filed May 11, 1948    2 SHEETS—SHEET 1

INVENTOR.
Rudolf Rabe
BY
Barnes, Kisselle, Laughlin & Raisch
ATTORNEYS.

Sept. 23, 1952 R. RABE 2,611,464
CAM OPERATED COUPLING
Filed May 11, 1948 2 SHEETS—SHEET 2

INVENTOR.
Rudolf Rabe
BY
Barnes, Kisselle, Laughlin & Raisch
ATTORNEYS.

Patented Sept. 23, 1952

2,611,464

UNITED STATES PATENT OFFICE 2,611,464

CAM OPERATED COUPLING

Rudolf Rabe, Inkster, Mich.

Application May 11, 1948, Serial No. 28,565

7 Claims. (Cl. 192—93)

This invention relates to a clutch for establishing and disestablishing a driving connection and it has to do particularly with a clutch structure so constructed and arranged that all the clutch parts and the operating means therefor are mounted on an operating part such as a shaft.

In certain types of machinery, such, for example, as a power driven lawn mower, difficulties are encountered in mounting a clutch control on some adjacent fixed structural part. Ofttimes there is no convenient structural part, particularly one located in the right position and sometimes other necessary structure and parts interfere with the mounting of the clutch control. With the present invention, the clutch and its control and the shaft upon which it is mounted are quite independent of other structural parts and need no association or relationship or mounting upon any other structural part of the machine.

Clutch structures made in accordance with the invention are shown in the accompanying drawings.

Figure 2:
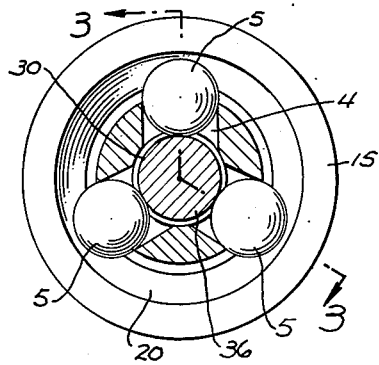
Fig. 2 is an enlarged cross sectional view taken substantially on line 2—2 of Fig. 1.
Figure 1:
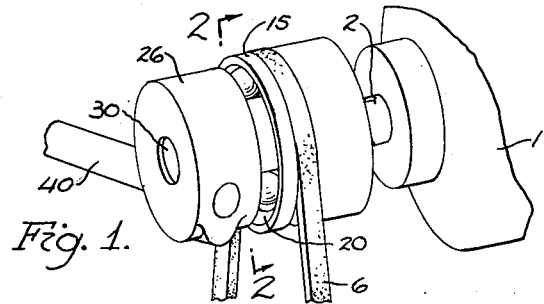
Fig. 1 is a perspective view illustrating a clutch and its control mounted on a motor shaft.
Figure 3:
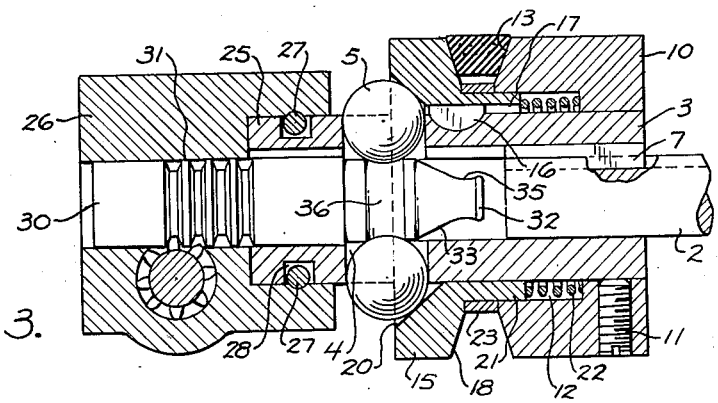
Fig. 3 is a sectional view taken on line 3—3 of Fig. 2 showing the clutch engaged.

As shown in Fig. 1, a suitable motor is indicated in part as at 1, and this motor may be a gasoline motor or an electric motor and the shaft thereof is shown at 2. A sleeve 3 is keyed to the shaft as at 7. This sleeve extends beyond the end of the shaft as shown in Fig. 3, and it has a number of openings therein, as shown at 4, for receiving balls 5. As illustrated in Fig. 2, there are three of such balls equally spaced apart.

The form of clutch shown in Figs. 1 to 4 is one for use with a belt drive, such as a V-belt 6. A pulley member 10 is mounted on the sleeve 3 in driving relationship and one manner of mounting the member 10 on the sleeve is by means of one or more screws 11. This pulley member is formed with a recess 12 and an inclined face 13 for engaging the belt. A second pulley member 15 is slidably keyed to the sleeve. For this purpose, the member 15 is keyed to the sleeve 3 as by means of a key 16 operable in a slot 17 of the pulley member. This pulley member has an inclined face 18 for engaging the belt and an internal conical formation forming a circumferential inclined wall 20, for cooperation with the balls 5. The member 15 has an extension 21 telescopingly and slidably disposed in the recess 12 and a coil spring 22 situated in a recess acts upon the two members to normally urge them axially apart. Positioned over the extension 22 and disposed between the members 10 and 15 is a freely revolving ring 23.

The sleeve 3 has an extending end 25 upon which is rotatably mounted a block or support 26 held on the sleeve by one or more pins 27 located in an annular groove 28 in the sleeve. The support has a bore therein for slidably receiving an actuator 30 provided with gear teeth 31 which may extend circumferentially of the member 30. This member 30 has a small inner end 32, an inclined part 33 joining the small end and its body portion, and it is preferably provided with shallow grooves at 35 and at 36.

A control in the form of a small gear or pinion 38 is journalled in the support 26 and it has its teeth in engagement with the gear teeth 31 of the actuator 30 and extending from the pinion 38 is an operating shaft 40 which may extend to any suitable and convenient location for access by an operator.

The clutch, as above mentioned, is shown in its engaged position in Fig. 3. The operator has turned the control shaft 40 to thus cause the pinion 38 to shift the actuator 36 to the right as Fig. 3 is viewed. At this time the balls 5 are held radially outwardly and may be engaged in the recess 36. The balls engage the surface 20 and thus hold pulley member 15 in close proximity to the pulley member 10. The two pulley members thus cooperate with their faces 13 and 18 forming a V-groove upon which the V-belt 6 operates. The belt is not shown in Fig. 3. At this time, the spring 22 is compressed.

Figure 4:
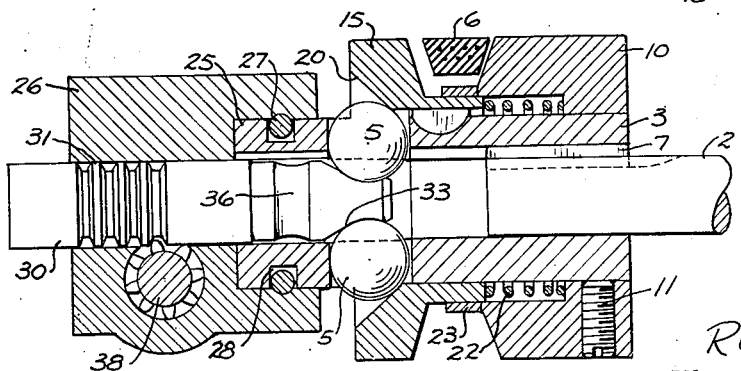
Fig. 4 is a view similar to Fig. 3 showing the clutch disengaged.

To release the clutch, the shaft 40 is turned so that the actuator 30 is shifted to the left to a position as indicated in Fig. 4. The actuator may be shifted to the left until the balls rest in the groove 35. As the balls thus move inwardly along the surface 20, the member 15 moves away from the member 10 thus opening the V-groove and disengaging the sides of the V-belt, as shown in Fig. 4. The spring 22 performs this function although initially other forces aid in shifting the member 15 away from the member 10, namely, the forces applied to the two pulley members by the V-belt itself. With the parts in the condition shown in Fig. 4, the V-belt will not be driven.

To engage the clutch the actuator 30 is shifted to the right by proper manipulation of the control member 40. The inclined surface 33 engages the balls and forces them radially outwardly in the pockets 4 and they engage the inclined surface 20 and shift the pulley member 15 back to the Fig. 3 position so that the belt is once again engaged in its groove. The slight recess 30 may be adequate for holding the balls in this position. On the other hand, the operator 40 may be locked in position to hold the actuator 30 in the Fig. 3 position. It will be noted that the entire structure is mounted on the shaft 2 and requires no support or reaction from an outside frame or bracket structure. While the shaft 2 has been referred to as a shaft of the motor, in which event the shaft will be the driving member it is, of course, feasible that the belt 6 be the driving member and the shaft 2 be the driven member. In the released position, if the shaft 2 be a driving member, the belt may rest upon the ring 23 with the pulley structure rotating while the ring is at rest. If the belt is the driving member, it may operate while resting upon the ring 23 with the ring turning and with the clutch structure at rest.

Figure 5:
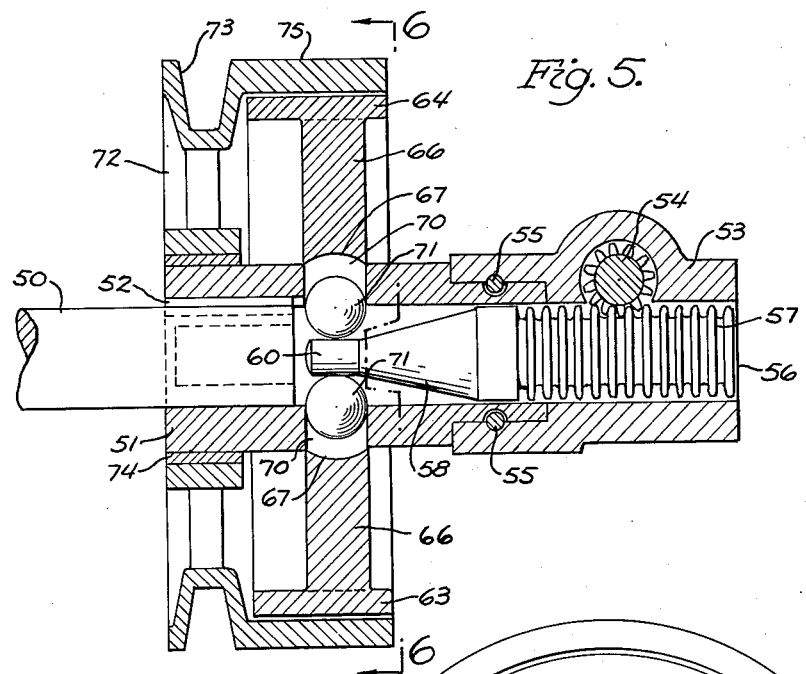
Fig. 5 is a cross sectional view of a different form of clutch illustrating the same disengaged.
Figure 7:
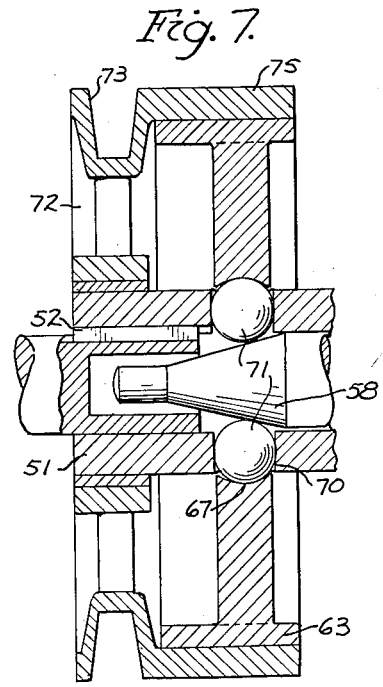
Fig. 7 is a cross sectional view similar to Fig. 5 showing the clutch engaged.
Figure 6:
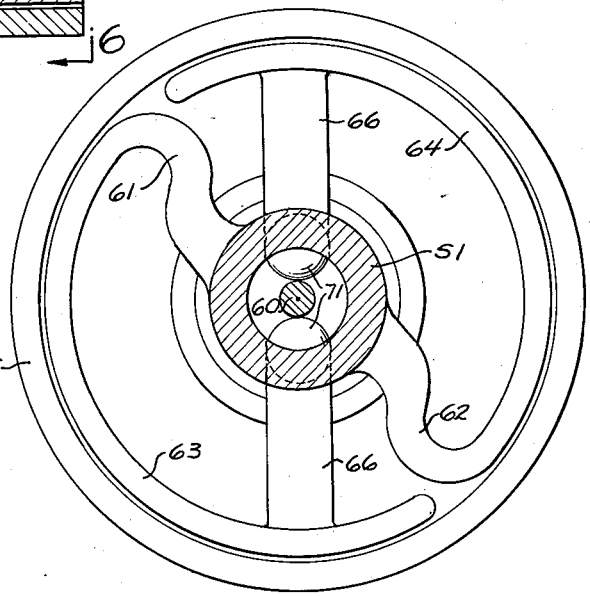
Fig. 6 is a view partly in section taken on line 6—6 of Fig. 5.

In the form shown in Figs. 5, 6 and 7, a shaft, which may be a driving or driven shaft, illustrated at 50, has a sleeve 51 keyed thereto as at 52. This sleeve has an extension upon which is mounted a support 53 and journalled in the support is a small gear or pinion 54 operable by a suitable control, such as a control similar to the control 40. The support 53 is rotatably pinned to the sleeve 51 as at 55. An actuator 56 with gear teeth 57 thereon is slidably disposed in the support and it has a tapered portion 58 with an ensmalled end 60.

The sleeve 51 has yieldable spokes 61 and 62 which carry arcuate shoe members 63 and 64, as will be seen by reference to Fig. 6. These shoe members are each carried at one end by the spokes and adjacent their free ends have inwardly extending lugs 66 with concaved inner ends 67. The sleeve 51 has openings 70 therein for the reception of balls 71 which are controlled by the inclined portion 58 of the actuator. A pulley 72 having a groove for a belt, as shown at 73, is journalled on the sleeve 51 as by means of a bearing 74 and the pulley has an overhanging circumferential flange or drum which overlies the shoes 63 and 64.

The clutch is shown in disengaged position in Fig. 5. In this condition, the shaft, if it be the driving shaft, is rotated, and likewise the sleeve is rotating, together with its shoes 63 and 64. The support 53 is not rotating due to its swivel mounting on the sleeve and also because of the control extension extending from the pinion 54. To engage the clutch the actuator 56 is shifted to the left as Fig. 5 is viewed, as by means of rotating the pinion 54, and the inclined surface 58 engages the balls and pushes them outwardly in the openings 70. When the clutch is disengaged the balls may rest upon the ensmalled end of the actuator 70. As the actuator shifts to the left and pushes the balls outwardly they engage the lugs 66 and force them outwardly thus forcing the shoes 63 and 64 outwardly with expansion causing them to frictionally engage the inner surface of the flange or drum 75. This establishes a driving connection between the shaft 50 and the pulley. To release the clutch the actuator is shifted back to the position shown in Fig. 5, and the yieldable arms 61 and 62 cause the shoes 63 and 64 to retract thus disengaging the drum of the pulley. In this structure it will be noted that the entire assembly is carried by the shaft 50 which may be a driving or driven shaft while the pulley may be a driven or driving member.

Figure 8:
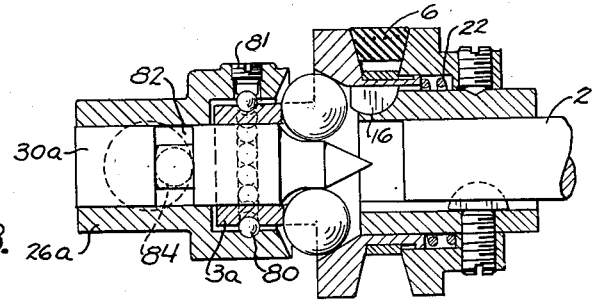
Fig. 8 is a cross sectional view showing a modified form.

The structure in Fig. 8 illustrates a modified form which has to do particularly with the mounting of the support on the shaft and the operator for the actuator. In this form the support 26a is rotatably mounted on the sleeve 3a by means of an annulus of ball bearings 80 located in matching grooves in the support and in the sleeve. These balls may be introduced through an opening in the support which is then closed by a plug 81. The actuator 30a is provided with an annular groove 82. The control member 83 which is rockably mounted in the support has a crank pin 84 positioned in the annular groove 82. It will be seen how a rocking action of the control 83 causes the crank pin 84 to shift the actuator. The movement of the actuator in this form is limited. In other words, the 180° movement of the control member shifts the crank pin through its maximum distance and results in the maximum axial movement of the actuator 30a.

I claim:

1. A clutch and operator therefor adapted for mounting on a torque transmitting shaft comprising, a sleeve adapted to be secured to the shaft, a pair of clutch elements mounted on the sleeve one of which is movable relative to the other, said sleeve having circumferentially spaced openings therein, a free body positioned in each opening and engageable with the movable clutch element, a support journalled on and supported entirely by the sleeve and co-axial with the shaft, an actuator mounted for axial shifting movement in the support, said actuator being on the axis of the shaft, control means including a control element mounted in the support so as to react thereon for shifting the actuator, and a tapered portion on the actuator for engaging and shifting the bodies radially outwardly to engage and shift the movable clutch element for causing clutch engaging action.

2. A clutch and operator therefor adapted for mounting on a torque transmitting shaft comprising, a sleeve adapted to be secured to the shaft, a pair of clutch elements mounted on the sleeve one of which is movable relative to the other, said sleeve having circumferentially spaced openings therein, a free ball positioned in each opening engageable with the movable clutch element, said sleeve having a part projecting beyond the end of the shaft and co-axial therewith, a support journalled on and supported entirely by the sleeve, an actuator co-axial with the shaft and mounted for axial shifting movement in the support, control means including a control element mounted in the support so as to react thereon for shifting the actuator, and a tapered portion on the actuator for engaging and shifting the balls radially outwardly to engage and shift the movable clutch element for causing clutch engaging action.

3. A clutch and operator therefor for mounting on a torque transmitting shaft comprising, a sleeve adapaed to be mounted on the shaft, a pulley element non-rotatably mounted on the sleeve, a second pulley element slidably keyed to the sleeve, the pulley elements being constructed to provide a groove for a belt, the second pulley element having a conical surface, the sleeve having a plurality of openings therein, a ball in each opening, a support rotatably mounted on the sleeve, an actuator slidably mounted in the support and having a tapered portion effective on the balls to urge them radially outwardly and engage the conical surface of the second pulley element whereby to shift the second pulley element toward the first pulley element for providing a groove with walls for engaging the belt.

4. A clutch and operator therefor for mounting on a torque transmitting shaft comprising, a sleeve adapted to be mounted on the shaft, a pulley element non-rotatably mounted on the sleeve, a second pulley element slidably keyed to the sleeve, the pulley elements being constructed to provide a groove for a belt, the second pulley element having a conical surface, the sleeve having a plurality of openings therein, a ball in each opening, a support rotatably mounted on the sleeve, an actuator slidably mounted in the support and having a tapered portion effective on the balls to urge them radially outwardly and engage the conical surface of the second pulley element whereby to shift the second pulley element toward the first pulley element for providing a groove with walls for engaging the belt, and a spring acting on the pulley elements for separating them when the actuator is shifted for movement of the balls radially inwardly.

5. A clutch and operator therefor for mounting on a torque transmitting shaft comprising, a sleeve adapted to be mounted on the shaft, a pulley element non-rotatably mounted on the sleeve, a second pulley element slidably keyed to the sleeve, the pulley elements being constructed to provide a groove for a belt, the second pulley element having a conical surface, the sleeve having a plurality of openings therein, a ball in each opening, a support rotatably mounted on the sleeve, an actuator slidably mounted in the support and having a tapered portion effective on the balls to urge them radially outwardly and engage the conical surface of the second pulley element whereby to shift the second pulley element toward the first pulley element for providing a groove with walls for engaging the belt, and an idler ring positioned rotatably between the pulley elements for engagement with the belt when the two pulley elements are separated.

6. A clutch and operator therefor for mounting on a torque transmitting shaft comprising, a sleeve adapted to be mounted on the shaft, a pulley element non-rotatably mounted on the sleeve, a second pulley element non-rotatably and slidably mounted on the sleeve, said pulley elements having telescoping parts and having faces for engaging a belt when the pulley elements are urged toward each other and for releasing the belt when the pulley elements are separated from each other, the second named pulley element having an internal conical surface, the sleeve having a plurality of openings therein, a ball in each opening, a support rotatably mounted on the sleeve, and an actuator slidably mounted in the support substantially on the axis of the shaft and having a tapered portion for causing the balls to shift radially inwardly and outwardly as the actuator is shifted, said balls engaging the said conical surfaces of the second pulley element to shift it toward the first pulley element.

7. A clutch and operator therefor for mounting on a torque transmitting shaft comprising, a sleeve adapted to be mounted on the shaft, a pulley element non-rotatably mounted on the sleeve, a second pulley element non-rotatably and slidably mounted on the sleeve, said pulley elements having telescoping parts and having faces for engaging a belt when the pulley elements are urged toward each other and for releasing the belt when the pulley elements are separated from each other, an idler ring rotatably mounted on a telescoping part of one of the pulleys for engagement with the belt when the pulley elements are separated, the second named pulley element having an internal conical surface, the sleeve having a plurality of openings therein, a ball in each opening, a support rotatably mounted on the sleeve, and an actuator slidably mounted in the support substantially on the axis of the shaft and having a tapered portion for causing the balls to shift radially inwardly and outwardly as the actuator is shifted, said balls engaging the said conical surfaces of the second pulley element to shift it toward the first pulley element.

RUDOLF RABE.

REFERENCES CITED

The following references are of record in the file of this patent:

UNITED STATES PATENTS

| Number | Name | Date |
| --- | --- | --- |
| 614,951 | Hoffmann | Nov. 29, 1898 |
| 658,520 | Abel | Sept. 25, 1900 |
| 670,264 | Willetts | Mar. 19, 1901 |
| 847,115 | Rucker | Mar. 12, 1907 |
| 890,211 | Bullard | June 9, 1908 |
| 1,485,236 | Merkel | Feb. 26, 1924 |
| 1,623,236 | Roo | Apr. 5, 1927 |
| 1,662,598 | Bierman | Mar. 13, 1928 |
| 2,004,750 | Eckhard | June 11, 1935 |
| 2,180,217 | Thomas | Sept. 20, 1938 |
| 2,244,169 | Miller | June 6, 1941 |
| 2,259,149 | Cederstrom | Oct. 14, 1941 |
| 2,453,580 | Lusk | Nov. 9, 1948 |
| 2,474,789 | Perhoes | June 28, 1949 |

FOREIGN PATENTS

| Number | Country | Date |
| --- | --- | --- |
| 914,073 | France | Sept. 27, 1946 |